United States Patent
Potrebic

(10) Patent No.: US 10,834,193 B2
(45) Date of Patent: Nov. 10, 2020

(54) SCHEDULED RETRIEVAL OF SHARED CONTENT

(71) Applicant: Box, Inc., Redwood City, CA (US)

(72) Inventor: Peter John Potrebic, Calistoga, CA (US)

(73) Assignee: Box, Inc., Redwood City, CA (US)

(*) Notice: Subject to any disclaimer, the term of this patent is extended or adjusted under 35 U.S.C. 154(b) by 0 days.

(21) Appl. No.: 16/262,718

(22) Filed: Jan. 30, 2019

(65) Prior Publication Data
US 2020/0244732 A1 Jul. 30, 2020

(51) Int. Cl.
| G06F 16/176 | (2019.01) |
| H04L 29/08 | (2006.01) |
| G06F 16/00 | (2019.01) |
| G06F 16/178 | (2019.01) |

(52) U.S. Cl.
CPC .......... *H04L 67/1097* (2013.01); *G06F 16/00* (2019.01); *G06F 16/176* (2019.01); *G06F 16/178* (2019.01)

(58) Field of Classification Search
CPC ..... H04L 67/1097; H04L 67/22; G06F 16/00; G06F 16/176; G06F 16/178; G06F 40/30; G06Q 10/10; G08G 1/096716; H04N 21/2368
See application file for complete search history.

(56) References Cited

U.S. PATENT DOCUMENTS

| 6,243,755 | B1 | 6/2001 | Takagi et al. | |
| 8,332,414 | B2 | 12/2012 | Nguyen et al. | |
| 9,049,250 | B2 | 6/2015 | Morse et al. | |
| 2003/0187984 | A1 | 10/2003 | Banavar et al. | |
| 2009/0249222 | A1* | 10/2009 | Schmidt | H04N 21/2368 715/751 |
| 2016/0227464 | A1* | 8/2016 | Senarath | G08G 1/096716 |
| 2017/0310814 | A1* | 10/2017 | Knight | G06Q 10/10 |
| 2018/0276226 | A1* | 9/2018 | Knight | H04L 67/22 |
| 2018/0374375 | A1* | 12/2018 | Doucette | G06F 40/30 |

* cited by examiner

*Primary Examiner* — Le H Luu
(74) *Attorney, Agent, or Firm* — Vista IP Law Group, LLP

(57) ABSTRACT

Methods, systems and computer program products for scheduling retrieval of shared content. Certain embodiments commence upon storing shared content at a collaboration system that is connected to a plurality of user devices by a network. After gathering one or more environmental conditions that correspond to at least one of the plurality of user devices, a time or a plurality of times is predicted, the predicted time or times corresponding to when conditions such as a user's device location or network strength conditions or other environmental conditions that affect the user devices might change. Based on the predicted times, a retrieval schedule is defined. The retrieval schedule includes instructions for initiating downloading of portions of the shared content from the collaboration system to the user device. Initiation of the start of downloading may be calculated to cause just-in-time downloading that completes just before the time of a predicted change in conditions.

20 Claims, 11 Drawing Sheets

SCHEDULED RETRIEVAL OF SHARED CONTENT

FIELD

This disclosure relates to collaboration systems, and more particularly to techniques for performing scheduled retrieval of shared content.

BACKGROUND

Collaboration systems have evolved to facilitate collaboration activity over millions of shared content objects (e.g., files, folders, etc.) by users who access such content objects using various user devices (e.g., laptop computers, smart phones, etc.). Such collaboration activity is often related to events involving user-content interactions (e.g., authoring, commenting, sharing, etc.) by the users over the content objects. Collaboration events may also pertain to user-to-user interactions (e.g., messaging actions, chatting, object sharing invitations, etc.) that may occur whenever two or more collaborating users are online.

While collaboration systems are often configured to be reliably always "up" and online (e.g., always connected to a high-bandwidth network such as the Internet), the user devices that are used to access the content objects at collaboration systems may be only periodically online, and thus may be periodically offline (e.g., disconnected from the Internet). Nevertheless, users want to have access to certain content objects even when their user device is offline. For example, a user might use a laptop computer to collaborate over a presentation file while connected to the office Wi-Fi while waiting for a flight, but also want to continue to work on the presentation while offline and on the flight. In this case, the presentation file needs to be retrieved (e.g., downloaded) to the user device before the user device is offline. Even when online, a user may want a certain content object stored locally on a user device (e.g., for fast loading of a large content object).

Unfortunately, approaches to retrieving remotely-stored content objects to a local computing environment are deficient with respect to determining both (1) what content objects to retrieve and (2) when to retrieve them. As an example, one approach to facilitating offline collaboration activity is to retrieve the entire corpus of content objects that a particular user has permission to access. This approach however, is not practical due to the often much smaller storage capacity of a user device as compared to the storage capacity consumed at the collaboration system by the corpus of content objects.

As an example, a smart phone might be configured to have merely a few gigabytes of storage, whereas a collaboration system may allocate many terabytes or petabytes of content object storage to store the content objects of a large enterprise.

Even when a smaller set of content objects that a user device can accommodate are selected for retrieval, current approaches are deficient in determining when the selected content objects are retrieved. In most cases, a content object is retrieved as soon as it has been identified. As such, the retrieval (e.g., download) may happen when network conditions are insufficient or at least less than ideal for downloading the content object. Moreover, for a content object associated with high levels of collaboration activity, a particular retrieved instance of the content object may not include the latest changes to the object. In cases where there are high levels of collaboration activities over content objects, downloading at the latest moment possible (e.g., just before the user device goes offline) is highly desired since (1) downloading at the latest moment possible would capture the latest changes, and (2) downloading just once at the latest moment would avoid unnecessary use of computing resources that would be incurred if multiple downloads had been invoked.

Such, legacy approaches fail to consider the degree of collaboration activity being taken over various content items, and thus may retrieve content objects too early. What is needed is a way to know when to retrieve certain shared content objects to the local computing environment of a user device such that the completion of the retrieval is neither too early or too late, but rather "just-in-time".

SUMMARY

The present disclosure describes techniques used in systems, methods, and in computer program products for scheduled retrieval of shared content, which techniques advance the relevant technologies to address technological issues with legacy approaches. More specifically, the present disclosure describes techniques used in systems, methods, and in computer program products for just-in-time retrieval of shared content objects. Certain embodiments are directed to technological solutions that consider usage patterns and environmental conditions when scheduling downloading of selected content objects from a shared repository to a local computing environment of a particular user device.

The disclosed embodiments modify and improve over legacy approaches. In particular, the herein-disclosed techniques provide technical solutions that address the technical problems attendant to knowing when to initiate retrieval of which shared content objects from a shared repository to the local computing environment of a particular user device. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication. For example, when performing computer operations that address the various technical problems underlying answering the question of when to initiate retrieval of which shared content objects from a shared repository to the local computing environment of a particular user device, both network bandwidth demanded and CPU cycles demanded are significantly reduced as compared to the network bandwidth usage and CPU cycles that would be needed but for practice of the herein-disclosed techniques. More specifically, the herein-disclosed techniques consider usage patterns and environmental conditions when scheduling downloading of selected content objects from a shared repository to a local computing environment of a particular user device. This technique reduces the likelihood that a content object would need to be downloaded multiple times to keep a current copy locally-stored on the user device.

Applications of the just-in-time retrieval scheduling techniques disclosed herein facilitate improvements in computer functionality that serve to reduce the demand for computer memory, reduce the demand for computer processing power, reduce network bandwidth use, and reduce the demand for intercomponent communication. Specifically, these techniques avoid consumption of computing resources to retrieve certain content objects multiple times (e.g., in response to high collaboration activity), and/or these techniques avoid consumption of computing resources to retrieve large content objects under costly network conditions.

The herein-disclosed techniques for considering usage patterns and environmental conditions when scheduling downloading of selected content objects from a shared repository to a local computing environment of a particular user device serve to overcome long-standing yet unsolved technological problems (e.g., knowing when to initiate retrieval of which shared content objects from a shared repository to the local computing environment).

Aspects of the present disclosure achieve performance and other improvements in peripheral technical fields including (but not limited to) human-machine interfaces and distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
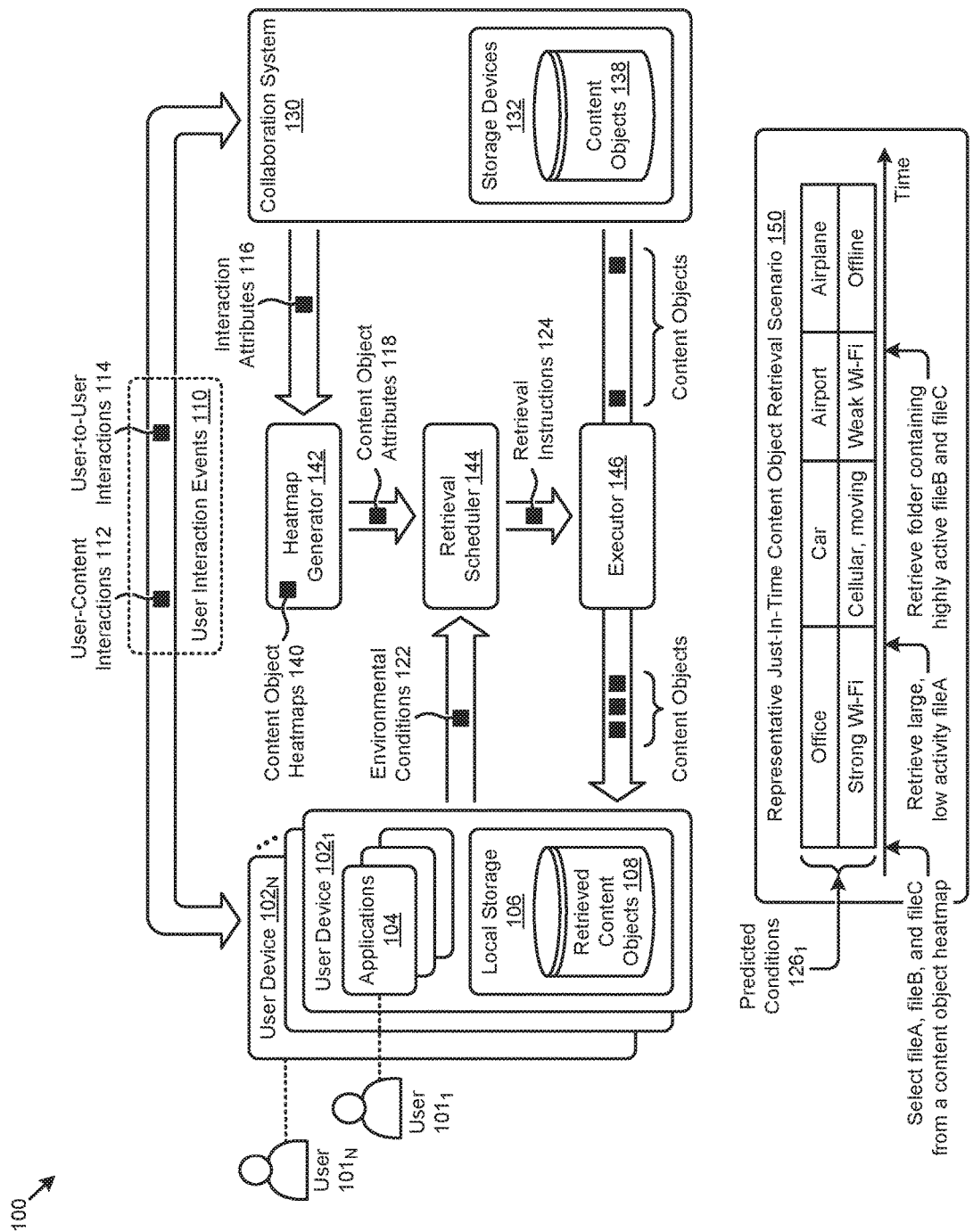
FIG. 1 illustrates a computing environment in which embodiments of the present disclosure can be implemented.

Aspects of the present disclosure solve problems associated with using computer systems to determine when to initiate retrieval of which shared content objects from a shared repository to the local computing environment of a particular user device. Some embodiments are directed to approaches that consider usage patterns and environmental conditions when scheduling downloading of selected content objects from a shared repository to a local computing environment of a particular user device. The accompanying figures and discussions herein present example environments, systems, methods, and computer program products for scheduling just-in-time retrieval of shared content objects.

Overview

Disclosed herein are techniques for scheduling the retrieval of selected content objects from a collaboration system to the respective local computing environments of the user devices of the content collaborators. In certain embodiments, the collaboration activity and environment conditions associated with the user devices and their respective users (e.g., collaborators) are continually monitored and recorded in a set of observation data. Such collaboration activity might pertain to user-content interaction events, user-to-user interaction events, explicit user indications of interests (e.g., user indications of "Favorites", user indications of "Marked for Offline", etc.) and/or other activity. The environmental conditions of the user devices might pertain to a geographical location, a network type and strength, and/or other conditions associated with the usage and/or environment of the user devices.

For each user and/or user device, the foregoing observation data are accessed to generate a content object "heatmap" that identifies the content objects the users may want to have locally stored on their devices. As used herein, a heatmap is the set of content objects that have been identified by operations at the content management system or by operations at the user device, which set of content objects are identified as those content objects that are predicted to be needed on the local user device even when the user device is offline, rather than being accessed from the collaboration system while the user device is online.

The observation data are further analyzed to determine retrieval schedules for a set of selected content objects from the content object heatmap. In certain embodiments, the selected content objects and/or the retrieval schedules are based at least in part on various predicted condition patterns derived at least in part from the observation data. In certain embodiments, instructions are generated and executed in accordance with the retrieval schedules to retrieve the content objects from the collaboration system to the user devices. In certain embodiments, the retrievals are performed so as to retrieve the latest available version of the content objects through just-in-time scheduling of the retrievals.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to considering usage patterns and environmental conditions when scheduling downloading of selected content objects from a shared repository to a local computing environment of a particular user device. Specifically, the figure presents a logical depiction of how the herein disclosed techniques can be used in a computing environment to determine when to initiate retrieval of which content objects from a collaboration system to the local computing environment of a user device associated with a particular user.

The logical depiction of FIG. 1 illustrates a selected set of users (e.g., user $101_1$, . . . , user $101_N$) and their respective user devices (e.g., user device $102_1$, . . . , user device $102_N$). The users access their user devices at least in part to interact with a set of content objects 138 stored (e.g., at storage devices 132) and/or otherwise managed by a collaboration system 130. As can be observed, various instances of user interaction events 110 occur between the user devices and collaboration system 130. More specifically, FIG. 1 illustrates that the users can invoke certain instances of user-content interactions 112 with various instances of content objects 138 (e.g., files, folders, etc.). As an example, a user $101_1$ might create a document and then share the document with other users (e.g., user $101_N$) for viewing, editing, or commenting by the other users.

Collaboration system 130 also facilitates interactions between the users through instances of user-to-user interactions 114. For example, a first user might invite a second user to collaborate on some task (e.g., building a design specification document), and/or might request to join a group of other users. A user-to-user interaction may also be based on an implicit user-to-user relationships (e.g., based on organizational structures).

Any of the user interaction events 110 can be facilitated by various instances of applications (e.g., application 104) operating on the user devices. For example, such applications might include a native application installed on a user device, or an application specifically designed to facilitate interactions with collaboration system 130. Furthermore, collaboration system 130 manages all of the user interactions (e.g., create, edit, delete, etc.) with content objects 138 so as to maintain a conflict-free version of each content object at collaboration system 130 that can be accessed by various user devices.

As earlier mentioned, the user devices that are used to access the content objects 138 at collaboration system 130 may be periodically offline. Nevertheless, users want to have access to certain content objects even when their user device is offline. As such, the certain content objects need to be retrieved (e.g., downloaded) to the user devices before the user devices go offline. For example, user $101_1$ may want to have a certain collection of retrieved content objects 108 stored in a local storage 106 of user device $102_1$ in anticipation that user device $102_1$ may (or will) go offline. Even when online, user $101_1$ may want a certain content object stored locally on a user device $102_1$ (e.g., for fast loading of a large content object). Approaches to retrieving remotely-stored content objects to particular user devices, however, are deficient with respect to determining both (1) what content objects to retrieve and (2) when to retrieve them. More specifically, such approaches are deficient with respect to determining when to retrieve certain shared content objects to the user device such that the completion of the retrieval is neither too early or too late, but rather "just-in-time".

As depicted in FIG. 1, the herein disclosed techniques address such problems attendant to knowing when to initiate retrieval of which shared content objects from collaboration system 130 to the user devices at least in part by implementing a heatmap generator 142, a retrieval scheduler 144, and an executor 146 in computing environment 100.

Specifically, heatmap generator 142 accesses a set of interaction attributes 116 that characterize the user interaction events 110 to generate various content object heatmaps. A content object heatmap as used herein is a representation of a set of content objects that highlights a certain attribute of the content objects. As an exemplary example, a content object heatmap might be formed for a particular user where the set of content objects comprises all of the content objects the user has permissions to access, and the attributes of the set of content objects pertains to measures (e.g., scores) of the respective collaboration activities associated with the set of content objects. In this case, the content object heatmap will serve to identify the portion of the content objects the user is most (and least) likely to want to access. Such content object heatmaps are used herein to also determine which portion of content objects the user will want to have stored locally on a user device (e.g., in case the user device goes offline). More specifically, heatmaps are representations of content objects and their respective locations, which content objects are determined to correspond to high collaboration activity and/or to correspond to high interest to a user (e.g., content objects that the user will want to have stored locally on the user's user devices).

With the portion of content objects 138 to retrieve to a particular user device being determined by a content object heatmap generated by heatmap generator 142, the timing of when to retrieve the selected content objects (e.g., a retrieval schedule) is determined by retrieval scheduler 144. To facilitate determination of a retrieval schedule, retrieval scheduler 144 ingests a set of content object attributes 118 that describe the selected content objects identified for a particular user (e.g., user $101_1$) and a set of environmental conditions 122 from a target user device associated with the user (e.g., user device $102_1$). Such environmental conditions from the target user device can be then-current and/or historical conditions that pertain to a time (e.g., current time of day), a network type (e.g., Wi-Fi, cellular, etc.), a network strength (e.g., 5 bars, 3 bars, etc.), a location, a status (e.g., active, sleep, powered off, etc.), and/or other conditions associated with the usage and/or environment of the user device. The environmental conditions 122 might also be derived from calendar entries, notifications (e.g., of a content object change received from collaboration system 130), and/or other information.

With knowledge of the aforementioned then-current and/or historical instances of environmental conditions 122, retrieval scheduler 144 determines a retrieval schedule that maps the selected content objects derived from the content object heatmap to a respective retrieval time. A set of retrieval instructions 124 are generated by retrieval scheduler 144 to deliver to executor 146. Executor 146 then executes the retrieval instructions 124 to retrieve the selected content objects from content objects 138 to retrieved content objects 108 in accordance with the corresponding retrieval schedule.

The assigned retrieval time for a particular content object is often based at least in part on the content object attributes of the content object and/or the user device conditions at the retrieval time, as predicted by retrieval scheduler 144. As such, the retrieval schedules determined in accordance with the herein disclosed techniques facilitate a "just-in-time" (e.g., not too early and not too late) retrieval of certain instances of content objects 138 from collaboration system 130 to one or more of the user devices. This capability is illustrated in FIG. 1 by a representative just-in-time content object retrieval scenario 150.

As shown, a set of content objects (e.g., fileA, fileB, and fileC) are selected for retrieval to a user device at some moment of time. For example, the selected content objects might be selected based at least in part on a content object heatmap generated by heatmap generator 142 for a target user device such as user device $102_1$. A set of predicted conditions $126_1$ over a certain period of time are determined. As an example, retrieval scheduler 144 might form predicted conditions $126_1$ based at least in part on various then-current and/or historical instances of environmental conditions 122 associated with user device $102_1$.

Specifically, predicted conditions $126_1$ indicate that user device $102_1$ (and user $101_1$) is expected to be in the "office" for a period of time before traveling by "car" to the "airport" to later board an "airplane". As can be observed, predicted conditions $126_1$ also includes predicted network types (e.g., "Wi-Fi", "cellular", etc.) and corresponding strengths (e.g., "strong", "weak", etc.). Based at least in part on predicted conditions $126_1$ and other information (e.g., content object attributes), the time of when to retrieve the selected contents objects (e.g., fileA, fileB, and fileC) is specified in a retrieval schedule that is determined by the herein disclosed techniques. As shown, fileA (e.g., a large file with low collaboration activity) is to be retrieved at a time when the user device is in an environment with a strong Wi-Fi signal. Furthermore, fileB and fileC are scheduled to be retrieved at a last possible moment in time (e.g., just before going "offline") due to the high collaboration activity (e.g., editing activity) associated with those content objects.

Applications of the just-in-time retrieval scheduling techniques disclosed herein facilitate improvements in computer functionality that serve to reduce the demand for computer memory, reduce the demand for computer processing power, reduce network bandwidth use, and reduce the demand for intercomponent communication. Specifically, consumption of such computing resources to retrieve certain content objects multiple times (e.g., in response to high collaboration activity), retrieve large content objects under costly network conditions, and/or retrieve content objects under some other undesired set of conditions is eliminated.

One embodiment of techniques for determining such just-in-time content object retrieval schedules is disclosed in further detail as follows.

Figure 2:
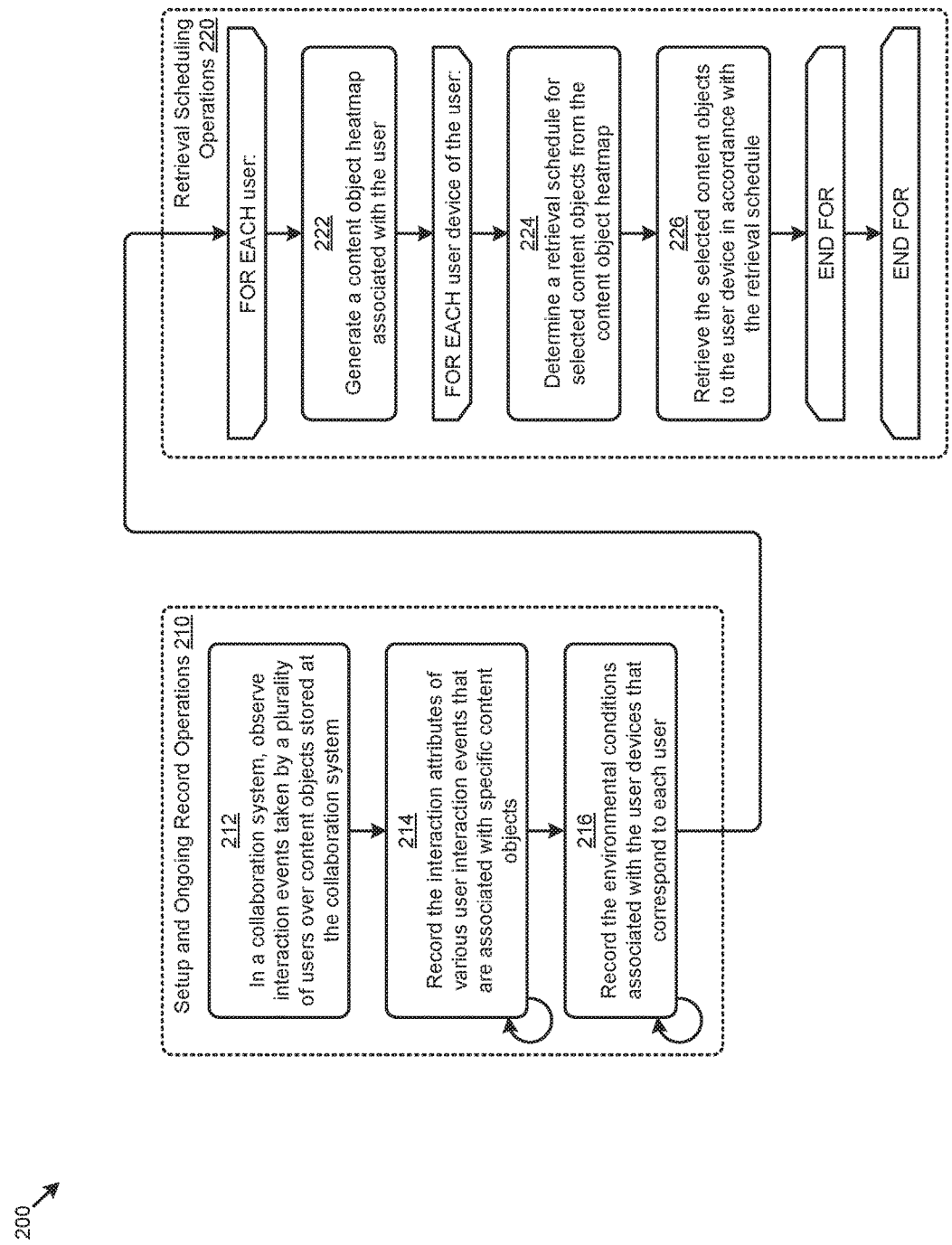
FIG. 2 depicts a content object retrieval scheduling technique as implemented in systems that facilitate just-in-time retrieval of shared content objects, according to an embodiment.

FIG. 2 depicts a content object retrieval scheduling technique 200 as implemented in systems that facilitate just-in-time retrieval of shared content objects. As an option, one or more variations of content object retrieval scheduling technique 200 or any aspect thereof may be implemented in the context of the architecture and functionality of the embodiments described herein. The content object retrieval scheduling technique 200 or any aspect thereof may be implemented in any environment.

FIG. 2 illustrates aspects pertaining to considering usage patterns and environmental conditions when scheduling downloading of selected content objects from a shared repository to a local computing environment of a particular user device. Specifically, the figure is presented to illustrate one embodiment of certain steps and/or operations performed over various devices (e.g., user devices, collaboration servers, etc.) to determine just-in-time retrieval schedules for retrieving selected content objects from a collaboration system to one or more user devices associated with the users of the collaboration system. As can be observed, the steps and/or operations can be grouped into a set of setup and ongoing record operations 210 and a set of retrieval scheduling operations 220.

The setup and ongoing record operations 210 of content object retrieval scheduling technique 200 commence by identifying a collaboration system that facilitates interactions over a plurality of users and a plurality of content objects (step 212). As earlier described, users that have access to the collaboration system might use various user devices to interact with each other in instances of user-to-user interactions and/or might interact with certain content objects (e.g., files, folders, etc.) managed by the system in instances of user-content interactions. The interaction attributes that characterize the foregoing user interaction events associated with the users and content objects at the system are recorded (step 214). As an example, certain interaction attributes associated with a user interaction event might be stored in a persistent storage facility to record a user's action (e.g., create, edit, view, etc.) taken on a particular content object (e.g., file, folder, etc.). As illustrated in the figure, the recording of the interaction attributes is an ongoing operation. The environment conditions associated with the user devices of the users are also continuously recorded (step 216). In most cases, such environmental conditions are device-specific and derived from various data (e.g., network connection information, calendar entry details, etc.) that are natively processed at a particular user's device.

As shown, the retrieval scheduling operations 220 of content object retrieval scheduling technique 200 are performed for each user with access to the collaboration system to determine user-specific results. Furthermore, a certain portion of the retrieval scheduling operations 220 are performed for each user device associated with the user. As an example, a first retrieval schedule might be determined for a user's smart phone, whereas a second retrieval schedule might be determined for a user's laptop computer.

The retrieval scheduling operations 220 commence by generating a content object heatmap that is associated with a particular user (step 222). As earlier mentioned, a content object heatmap will often serve to identify the portion of a set of content objects a particular user is most (and least) likely to want to access and/or have stored locally on a user device (e.g., in case the user device goes offline). For example, a content object heatmap may indicate a level of collaboration activity (e.g., derived from the recorded interaction attributes) over the content objects and/or other users associated with a particular user.

For each user device associated with the user, a retrieval schedule is determined for selected content objects from the content object heatmap (step 224). The retrieval schedule is often specific for each user device as it can be determined at least in part from the recorded environmental conditions associated with a particular user device. For example, the most highly active content objects for a user as identified by the content object heatmap of the user are scheduled to be retrieved in the retrieval schedule in accordance with predict conditions derived from the environmental conditions associated with the user's user device. The selected content objects are then retrieved to the user device in accordance with the retrieval schedule (step 226). As an example, a set of retrieval instructions that are generated to carry out the retrieval schedule can be queued and executed to retrieve the selected content objects. Such instructions might include tests and/or rules in addition to retrievals. For example, some instructions might implement a test and/or rule such that if the content item to be retrieved is not different from a copy of the content item already present on the user device, then the retrieval can be skipped until a later moment in time.

One embodiment of a system for implementing the content object collaboration recommendation technique of FIG. 2 is disclosed as follows.

Figure 3:
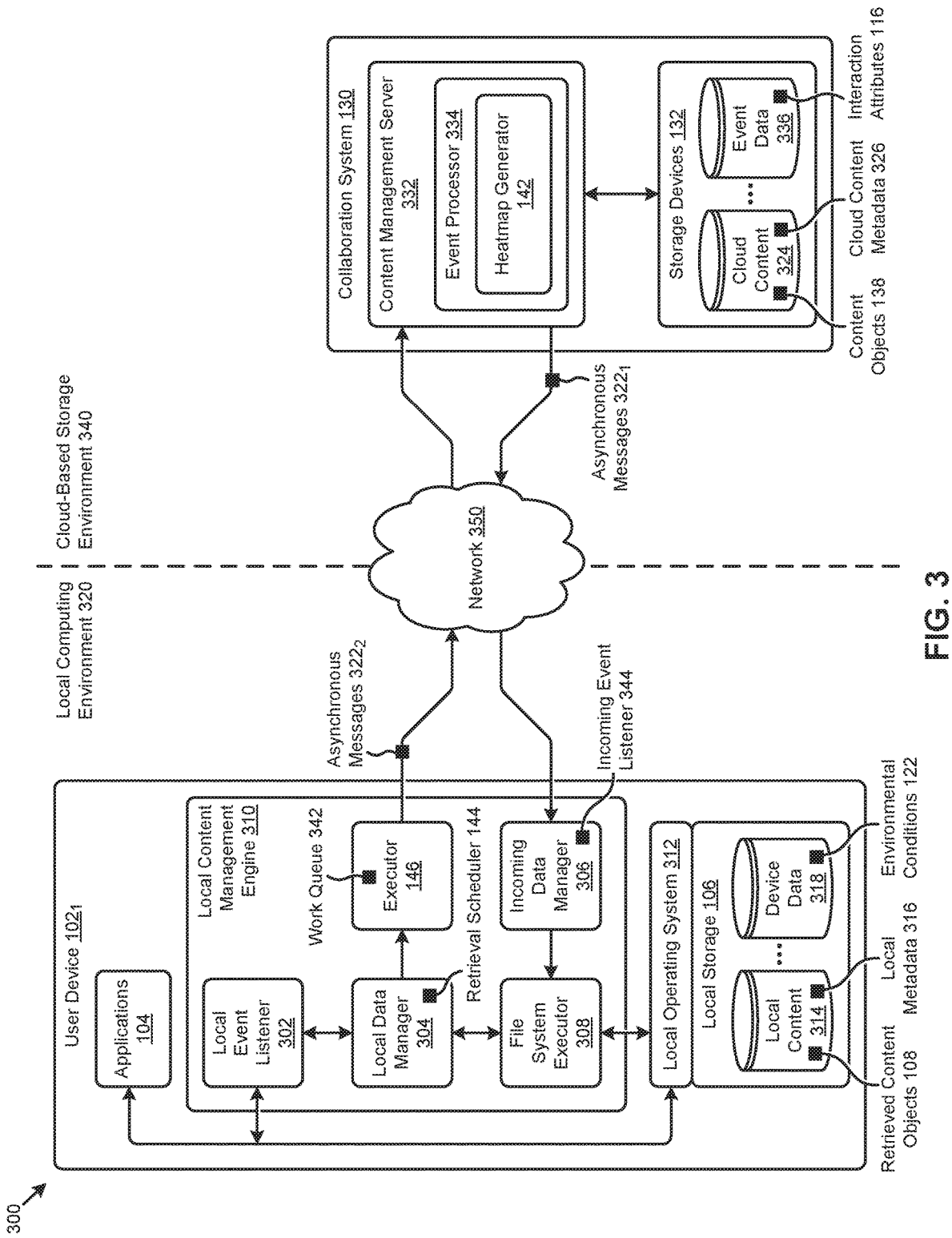
FIG. 3 is a block diagram of a system that implements just-in-time retrieval of shared content objects, according to an embodiment.

FIG. 3 is a block diagram of a system 300 that implements just-in-time retrieval of shared content objects. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to considering usage patterns and environmental conditions when scheduling downloading of selected content objects from a shared repository to a local computing environment of a particular user device. Specifically, the figure is being presented to show one embodiment of certain representative components and associated data flows that describes how the herein disclosed techniques might be implemented in a computing environment that comprises a cloud-based storage environment 340 and one or more instances of a local computing environment 320. Specifically, the figure depicts an embodiment in which certain components (e.g., agents, engines, applications, etc.) are implemented on a user device to record environmental conditions, generate retrieval schedules, manage and/or synchronize content with a collaboration system, and/or perform other operations in accordance with the herein disclosed techniques. Furthermore, the figure depicts an embodiment in which certain components (e.g., agents, engines, servers, etc.) are implemented at a collaboration system to record user interaction events, generate content object heatmaps, manage and/or synchronize content with various user devices, and/or perform other operations in accordance with the herein disclosed techniques.

The components, data flows, and data structures shown in FIG. 3 present one partitioning and associated data manipulation approach. The specific example shown is purely exemplary, and other subsystems, data structures, and/or partitionings are reasonable.

As shown, system 300 comprises several components earlier described. Specifically shown are user device $102_1$ in local computing environment 320 and collaboration system 130 in cloud-based storage environment 340. User device $102_1$ and local computing environment 320 represent a plurality of user devices and respective local computing environments that might be associated with a particular collaboration system and remote (e.g., cloud-based) storage environment.

One or more applications 104 at user device $102_1$ are accessed to interact with various instances of local content 314 stored in local storage 106 through a local operating system 312, which may include a local file system. In the embodiment of FIG. 3, the local operating system 312 is specific (e.g., native) to user device $102_1$. For example, one of the applications 104 might be Microsoft Word, which will interact with a local file system of local operating system 312 to open a document (e.g., with a .docx extension) from local content 314 and then to save an edited version of the document.

As can be observed, a local content management engine 310 is implemented at user device $102_1$. To facilitate at least some of the operations of local content management engine 310, a certain portion of local storage 106 at user device $102_1$ is allocated to a set of local metadata 316. Local metadata 316 can comprise sets of remote view metadata and sets of local view metadata. The remote view metadata represents the last known view (e.g., before going offline) of the metadata associated with one or more remotely-stored content objects, and the local view metadata represents the then-current view of the metadata associated with local instances of the content objects (e.g., retrieved content objects 108). Any of the foregoing sets of metadata in local metadata 316 might be configured to comprise internal data structures for fast access. In some cases, such internal data structures can be protected (e.g., locked).

In some cases, local metadata 316 can comprise attributes that are specific to the local operating system 312 of user device $102_1$. For example, the structure and/or attributes associated with local metadata 316 might be established at compile time of local content management engine 310 based at least in part on the operating system type of local operating system 312. As a specific example for a Mac operating system (OS), local metadata 316 might include certain extended attributes (e.g., stored in an "xattr[ ]" object), a user identifier (e.g., stored in a "UID" field), and/or a group identifier (e.g., stored in a "groupID" field).

In cloud-based storage environment 340, a content management server 332 can represent the various computing devices that carry out the operations of a collaboration system 130 (e.g., cloud-based shared content storage platform). Content management server 332 accesses the storage devices 132 that comprise a set of cloud content 324 and/or other data to facilitate the cloud-based storage operations. As shown, cloud content 324 comprises content objects 138 and certain instances of cloud content metadata 326 associated with content objects 138 remotely stored in cloud-based storage environment 340. For example, cloud content metadata 326 might include certain attributes that characterize the location, version, permissions, access rules, and/or other characteristics of a particular content object. Furthermore, cloud content 324 can comprise the instances of content objects 138 that are retrieved to the various local computing environments (e.g., local computing environment 320) of respective user devices (e.g., user device 102$_1$) in accordance with the herein disclosed techniques. For example, the retrieved content object 108 locally-stored in local content 314 can represent the local instances of selected content objects from content objects 138 that were retrieved in accordance with a retrieval schedule determined by the herein disclosed techniques.

A local event listener 302 is included in local content management engine 310 to detect interactions between applications 104 and local operating system 312. As an example, local event listener 302 might detect a request from a native application to open a remotely-stored content object (e.g., from content objects 138) that is not locally stored (e.g., in local content 314). Local event listener 302 interprets such detected interactions, which may be OS-specific interactions (e.g., OS-specific file system calls), to be dispatched to a local data manager 304 in a structure common (e.g., OS-agnostic) to local content management engine 310.

In response to receiving the dispatched messages, local data manager 304 issues one or more commands and/or calls to a file system executor 308 and/or an executor 146. In some cases, received messages might be placed in a work queue 342 for later processing. File system executor 308 processes commands from local data manager 304 that pertain to local computing environment 320, while executor 146 processes commands from local data manager 304 that pertain to cloud-based storage environment 340. Specifically, file system executor 308 processes commands and/or calls associated with local operating system 312 and/or local storage 106, such as a change to local metadata 316 and/or a change to local content 314.

For example, an edit to a portion (e.g., chunk) of a content object using a native application might invoke a call to file system executor 308 to change various metadata attributes (e.g., version, size, last modified timestamp, etc.) in local metadata 316 and/or change the portions of local content 314 that correspond to the modified content object chunk. In some cases, such operations by file system executor 308 are invoked synchronously in response to the originating file system interaction dispatched from local event listener 302.

In comparison, executor 146 receives calls from local data manager 304 into a work queue 342 for delivery to content management server 332 over a network 350. For example, the foregoing edit to the portion of the content object might also invoke a call to executor 146 to change various object metadata attributes (e.g., version, size, last modified timestamp, etc.) in cloud content metadata 326 and/or change portions of cloud content 324 corresponding to the modified content object chunk. Such operations can be carried out in response to one or more asynchronous messages issued from work queue 342 of executor 146. Content management server 332 can receive such asynchronous messages from any and all of the user devices of various collaborators.

In environments where collaborators work asynchronously on various shared content it is possible for conflicts to occur. In the embodiment of FIG. 3, remediation of conflicts between content objects 138 and retrieved content objects 108 can be facilitated by one or more conflict remediators at content management server 332 and/or at local content management engine 310. For example, if the conflict remediator at content management server 332 detects two conflicting operations to be applied over a single content object, the conflict remediator will order the operations appropriately and apply version indicators as needed. If the conflict remediator at local content management engine 310 detects that a content object was edited both locally and remotely, the conflict remediator would generate actions, messages and/or events to be performed in local computing environment 320.

In some cases, the remote and local conflict remediators might operate independently or, in other cases, the conflict remediators might operate in a coordinated manner. The conflict remediator at content management server 332 can reconcile the information (e.g., versions, object changes, etc.) received from local computing environment 320 to deliver (e.g., broadcast) the reconciled information to the various user devices of the relevant collaborators in a set of asynchronous messages. For example, the asynchronous messages 322$_1$ might constitute various notifications from content management server 332 that describe object metadata updates and/or content object updates to be recorded at the user devices by respective instances of the local content management engine.

Instances of such asynchronous notification and/or updates can be received locally by an incoming event listener 344 of an incoming data manager 306 operating at local content management engine 310 of user device 102$i$. Incoming data manager 306 can schedule the received changes with file system executor 308 to be applied to local storage 106 through local operating system 312. In some cases, the timing of when the changes associated with a particular notification are applied depends on a then-current retrieval schedule and/or a set of scheduling logic as determined by the herein disclosed techniques. As an example, certain actions (e.g., content object retrieval from collaboration system 130) to be taken for a particular notification may be deferred in accordance with a then-current retrieval schedule and/or a set of scheduling logic at the user device. When a response to a notification is deferred, the notification information (e.g., content object attributes, action or actions, etc.) is stored at the user device for later access (e.g., to determine a retrieval schedule).

To facilitate the herein disclosed techniques, an event processor 334 is implemented at content management server 332. Event processor 334 detects user interaction events by monitoring the instances of asynchronous messages (e.g., asynchronous messages 322$_2$) issued by various user devices (e.g., by user device 102$_1$) associated with the users of collaboration system 130. Instances of interaction attributes 116 that characterize the user interaction events are stored by event processor 334 in a set of event data 336 at storage devices 132. The interaction attributes 116 are accessed by one or more instances of a heatmap generator 142 at event processor 334 to generate user-specific instances of the content object heatmaps earlier described. The content object attributes associated with the content object heatmaps can be communicated to the user devices of the users in instances of asynchronous messages 322$_2$.

As depicted in local computing environment 320, a storage area to store a set of device data 318 is allocated over local storage 106. Device data 318 comprises the environmental conditions 122 associated with user device 102$_1$ that are recorded and stored to facilitate the herein disclosed techniques. As an example, local event listener 302 at local content management engine 310 can be configured to continually poll the local operating system 312 for instances of environmental conditions 122 and use local data manager 304 and file system executor 308 to store the conditions in device data 318.

A retrieval scheduler 144 at local data manager 304 accesses the environmental conditions 122 (e.g., including deferred notifications), content object attributes associated with content object heatmaps (e.g., received from content management server 332), and/or other information to determine just-in-time retrieval schedules. Various instructions to carry out the retrieval schedule are issued by retrieval scheduler 144 at local data manager 304 to executor 146 and/or file system executor 308 to retrieve selected content objects from content objects 138 at collaboration system 130 for storage as retrieved content objects 108 at user device $102_1$.

The foregoing discussions include techniques for generating content object heatmaps that are associated with various users with access to shared content objects (e.g., step 222 of FIG. 2), which techniques are disclosed in further detail as follows.

Figure 4:
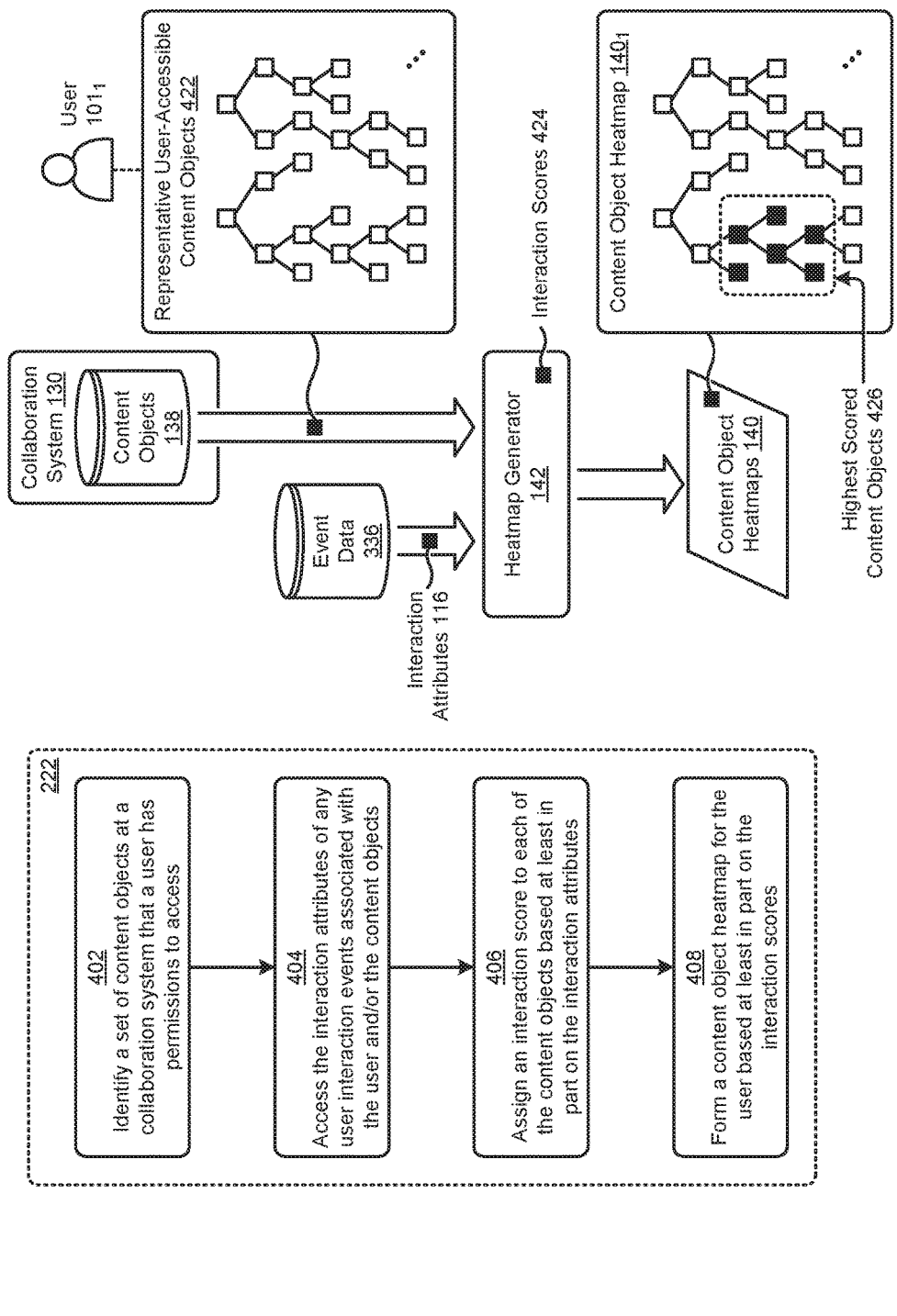
FIG. 4 depicts a content object heatmap generation technique as implemented in systems that facilitate just-in-time retrieval of shared content objects, according to an embodiment.

FIG. 4 depicts a content object heatmap generation technique 400 as implemented in systems that facilitate just-in-time retrieval of shared content objects. As an option, one or more variations of content object heatmap generation technique 400 or any aspect thereof may be implemented in the context of the architecture and functionality of the embodiments described herein. The content object heatmap generation technique 400 or any aspect thereof may be implemented in any environment.

FIG. 4 illustrates aspects pertaining to considering usage patterns and environmental conditions when scheduling downloading of selected content objects from a shared repository to a local computing environment of a particular user device. Specifically, the figure is presented to illustrate one embodiment of certain steps and/or operations for generating content object heatmaps that are associated with various users with access to shared content objects managed by a collaboration system. As depicted in the figure, the steps and/or operations are associated with step 222 of FIG. 2. A representative scenario is also shown in the figure to illustrate an example application of content object heatmap generation technique 400.

Content object heatmap generation technique 400 commences with identifying a set of content objects at a collaboration system that a user has permissions to access (step 402). As an example, FIG. 4 depicts a graphical view of a set of representative user-accessible content objects 422 associated with user $101_1$ that are identified from content objects 138 at collaboration system 130. The interaction attributes of any user interaction events associated with the user and/or the set of content objects are accessed (step 404). For example, instances of interaction attributes 116 from event data 336 that correspond to user $101_1$ and/or the representative user-accessible content objects 422 are accessed.

An interaction score is then assigned to each of the set of content objects based at least in part on the interaction attributes (step 406). As shown in the scenario of FIG. 4, a heatmap generator 142 ingests the representative user-accessible content objects 422, interaction attributes 116, and/or other information to determine a set of interaction scores 424 that are assigned to the content objects. Such interaction scores are numerical representations of the relative collaboration activity associated with a particular content object. As an example, an interaction score for a particular content object might be derived from a measure of the strength of the relationship of the content object to a subject user (e.g., user $101_1$).

Further details regarding general approaches to scoring the relationships between users and content objects are described in U.S. application Ser. No. 16/154,679 titled "ON-DEMAND COLLABORATION NETWORKS", filed on Oct. 8, 2018, which is hereby incorporated by reference in its entirety.

Based at least in part on the foregoing interaction scores, a content object heatmap is formed for the user (step 408). As shown, for example, heatmap generator 142 forms a plurality of content object heatmaps 140 for a plurality of respective users, including a content object heatmap $140_1$ for user $101_1$. In this case, the attribute of the content objects highlighted in content object heatmap $140_1$ is the interaction score. As such, content object heatmap $140_1$ serves to identify a set of highest scored content objects 426 from among the representative user-accessible content objects 422. For example, the highest scored content objects 426 might comprise the top 25% of the content objects (e.g., files, folders, etc.) as ranked by their respective interaction scores.

As earlier mentioned, the content object heatmap $140_1$ can serve to identify the selected content objects that are to be retrieved to one or more user devices of a particular user in accordance with a retrieval schedule. Moreover, in addition to defining a retrieval schedule based on the foregoing content object heatmap, the retrieval schedule might be based on characteristics of the specific user device. For example, a desktop PC might be observed to be always online and always in the same location, whereas a smartphone might be observed to be intermittently online and in many locations. As another example, a desktop PC might be observed to have a large amount of available storage space, whereas a smartphone might be observed to have much less available storage space. As such, a retrieval schedule pertaining to a desktop PC might be greedy (e.g., by downloading content objects freely and liberally), whereas a retrieval schedule pertaining to a smartphone might be parsimonious (e.g., by downloading only certain content objects).

Still further techniques for determining such retrieval schedules (e.g., step 224 of FIG. 2) are disclosed in detail as follows.

Figure 5:
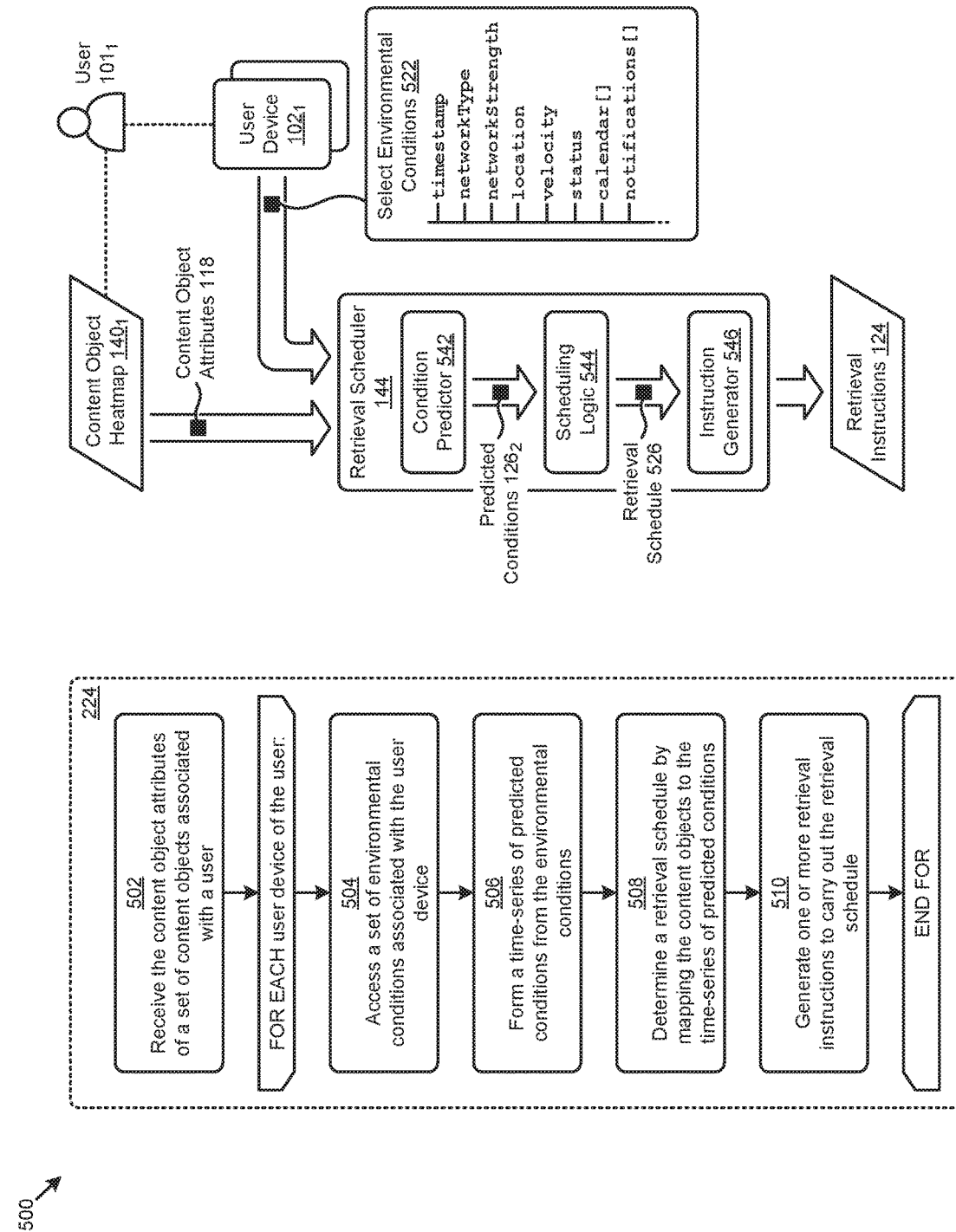
FIG. 5 presents a retrieval schedule generation technique as implemented in systems that facilitate just-in-time retrieval of shared content objects, according to an embodiment.

FIG. 5 presents a retrieval schedule generation technique 500 as implemented in systems that facilitate just-in-time retrieval of shared content objects. As an option, one or more variations of retrieval schedule generation technique 500 or any aspect thereof may be implemented in the context of the architecture and functionality of the embodiments described herein. The retrieval schedule generation technique 500 or any aspect thereof may be implemented in any environment.

FIG. 5 illustrates aspects pertaining to considering usage patterns and environmental conditions when scheduling downloading of selected content objects from a shared repository to a local computing environment of a particular user device. Specifically, the figure is presented to illustrate one embodiment of certain steps and/or operations for determining retrieval schedules for content objects selected for retrieval to the user devices of users of a collaboration system. As depicted in the figure, the steps and/or operations are associated with step 224 of FIG. 2. A representative scenario is also shown in the figure to illustrate an example application of retrieval schedule generation technique 500.

Retrieval schedule generation technique 500 commences with receiving a set of content object attributes that pertain to selected content objects that are associated with a user of a collaboration system (step 502). As shown in the scenario of FIG. 5, a set of content object attributes 118 corresponding to a content object heatmap $140_1$ associated with user $101_1$ might received by a retrieval scheduler 144. For example, content object attributes 118 might describe certain attributes (e.g., object identifier, object type, object size, etc.) of the "hottest" content objects (e.g., the content objects having the highest interaction scores) of content object heatmap $140_1$.

For each user device of the user, a set of environmental conditions associated with the user device are accessed (step 504). For example, retrieval scheduler 144 might access the environmental conditions associated with user device $102_1$ of user $101_1$. As depicted in a set of select environmental conditions 522, an environmental conditions data record (e.g., data table row or data object instance) for a particular set of conditions might describe a time associated with the conditions (e.g., stored in a "timestamp" field), a network type (e.g., stored in a "networkType" field), a network strength (e.g., stored in a "networkStrength" field), a geographical location (e.g., stored in a "location" field), a velocity indication (e.g., stored in a "velocity" field), a device status (e.g., stored in a "status" field), a set of calendar information (e.g., stored in a "calendar[ ]" object), a set of notification information (e.g., stored in the shown "notifications[ ]" object), and/or other condition attributes. As such, a time-series of predicted conditions could include prediction of impending network changes.

Any or some or all of the foregoing environmental conditions can be used in determining a retrieval schedule. Strictly as an example, the value in the "velocity" field (e.g., traveling speed) might be used to determine time remaining before going offline (e.g., time remaining before the user device reaches a cellular dead spot along a roadway). As another example, the "calendar[ ]" object might comprise certain attributes that describe calendar events that are managed by the native calendar application at the user device as of a particular moment in time (e.g., as may be specified in the "timestamp" field).

In some cases, the notifications derive from calendar information. For example, a calendar entry labeled "Leave early Today" might raise a notification and corresponding timestamp. Such a notification might in turn be indicative of a change in the environment, which in turn can influence scheduling of retrievals. Additionally or alternatively, the notifications (e.g., as stored in the "notifications[ ]" object) might comprise, for example, the attributes of any notifications that have been deferred as of a particular moment in time.

Based at least in part on the environmental conditions that are received, a time-series of predicted conditions are formed (step 506). For example, a condition predictor 542 at retrieval scheduler 144 might analyze the then-current and historical environmental conditions associated with user device $102_1$ to detect various usage patterns associated with the user device. Such usage patterns can then be extrapolated to form a time-series of predicted conditions $126_2$. As an example, a set of environmental conditions might indicate that user device $102_1$ transitions from an office Wi-Fi network to a moving cellular network (e.g., in a car on the road) near 6:00 pm every weekday. As such, a time-series of predicted conditions would specify that that this network type transition is expected to occur on future weekdays.

A retrieval schedule is then determined by mapping the content objects described by the content object attributes to the time-series of predicted conditions (step 508). For example, predicted conditions $126_2$ and content object attributes 118 are applied to a set of scheduling logic 544 at retrieval scheduler 144 to determine a retrieval schedule 526. A set of logic such as scheduling logic 544, or any other logic described herein, comprises programming code that forms one or more constraints to apply to certain functions and/or operations.

For example, the programming code might comprise the conditional logic operands (e.g., input variables, conditions, constraints, etc.) and/or operators (e.g., "if", "then", "and", "or", "greater than", "less than", etc.) for forming a conditional logic statement that returns one or more results. As merely one example, scheduling logic 544 might comprise conditional logic statements that map the retrieval of a large (e.g., greater than 1 MB), low activity (e.g., interaction score below some predefined threshold) content object to a moment in time when the network conditions are predicted to exhibit a strong Wi-Fi signal. As another example, scheduling logic 544 might comprise conditional logic statements that map the retrieval of a highly active (e.g., interaction score above some predefined threshold) content object to a moment in time just before the user device is predicted to go offline.

When the retrieval schedule is determined, a set of retrieval instructions to carry out the retrieval schedule is generated (step 510). For example, an instruction generator 546 at retrieval scheduler 144 generates a set of retrieval instructions 124 that are issued and/or queued for execution.

Applications of the various techniques disclosed herein for performing scheduled retrieval of shared content are described in detail in the following.

Figure 6:
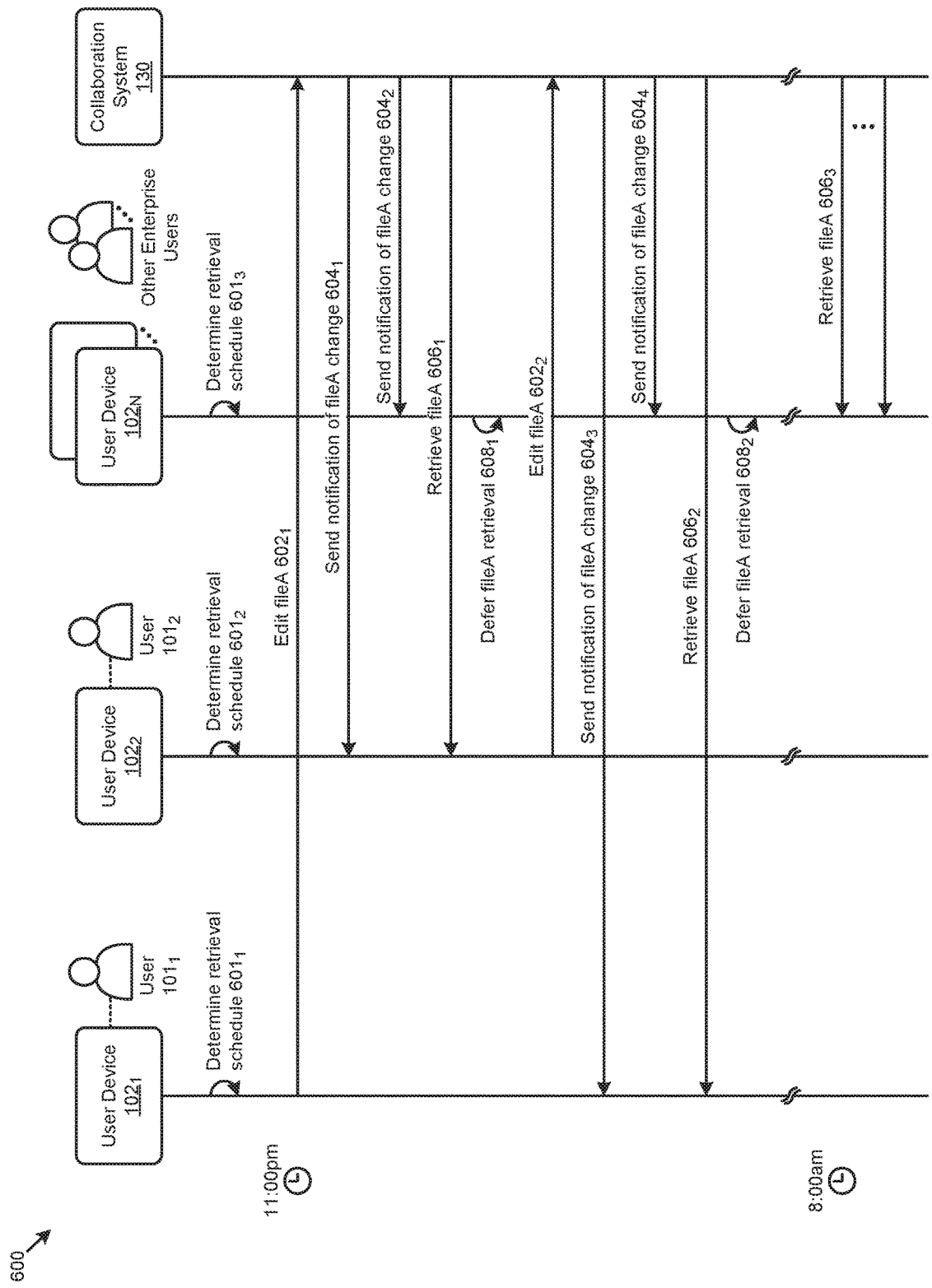
FIG. 6 illustrates a deferred content object retrieval scenario for just-in-time retrieval of shared content objects, according to an embodiment.

FIG. 6 illustrates a deferred content object retrieval scenario 600 for just-in-time retrieval of shared content objects. As an option, one or more variations of deferred content object retrieval scenario 600 or any aspect thereof may be implemented in the context of the architecture and functionality of the embodiments described herein. The deferred content object retrieval scenario 600 or any aspect thereof may be implemented in any environment.

FIG. 6 illustrates aspects pertaining to considering usage patterns and environmental conditions when scheduling downloading of selected content objects from a shared repository to a local computing environment of a particular user device. Specifically, the figure is being presented to illustrate a representative content object retrieval scenario in which the retrieval of certain content objects is scheduled (e.g., deferred) based at least in part on a retrieval schedule determined according to the herein disclosed techniques. The high order interactions (e.g., operations, messages, etc.) of the scenario are performed by various computing components earlier described. The particular computing components shown in FIG. 6 are collaboration system 130 and representative instances of user devices (e.g., user device $102_1$, user device $102_2$, . . . , user device $102_N$) and their users (e.g., user $101_1$, user $101_2$, and one or more other enterprise users).

The deferred content object retrieval scenario 600 commences with a retrieval schedule being determined for each of the representative user devices (operation $601_1$, operation $601_2$, operation $601_3$) in accordance with the herein disclosed techniques. As some moment in time (e.g., 11:00 pm), user $101_1$ edits fileA using user device $102_1$ and saves the changes at collaboration system 130 (message $602_1$). In response to detecting the edit event, collaboration system 130 sends a notification of the fileA change to user device $102_2$ of user $101_2$ (message $604_1$) and to user device $102_N$ associated with the other enterprise users (message $604_2$).

In consideration of the retrieval schedule associated with user device $102_2$, an instance of the changed fileA is retrieved from collaboration system 130 for receipt by user device $102_2$ (message $606_1$). The retrieval schedule associated with user device $102_N$, however, indicates that a retrieval of fileA in response to the notification is to be deferred (operation $608_1$). In this case, the specific times used in respective retrieval schedules might account for known or predicted collaboration activities as pertains to fileA that indicate that user $101_2$ (e.g., through user device $102_2$) actively collaborates (e.g., co-edits) fileA near this time (e.g., 11:00 pm) every evening, whereas the other enterprise users do not actively collaborate over the file at this time. As such, user $101_2$ needs to have local access to fileA (e.g., since the user has been observed to perform collaboration activities at 11:00 pm), whereas the other enterprise users can defer retrieval until a later time, such as in the morning.

As further illustrated in deferred content object retrieval scenario 600, when user $101_2$ edits fileA using user device $102_2$ (message $602_2$), collaboration system 130 sends a notification of the fileA change to user device $102_1$ of user $101_1$ (message $604_3$) and to user device $102_N$ associated with the other enterprise users (message $604_4$). In consideration of the respective retrieval schedules associated with user device $102_1$ and user device $102_N$, an instance of the changed fileA is retrieved from collaboration system 130 for receipt by user device $102_1$ (message $606_2$), whereas the retrieval of fileA to user device $102_N$ is deferred (operation $608_2$).

At some later moment in time (e.g., 8:00 am), the retrieval schedule associated with user device $102_N$ triggers the retrieval of the most up-to-date instance of fileA from collaboration system 130 (message $606_3$) for receipt by user device $102_N$. As illustrated in the figure, other user devices associated with the other enterprise users may also retrieve an instance of fileA to be stored locally at the user devices.

Figure 7:
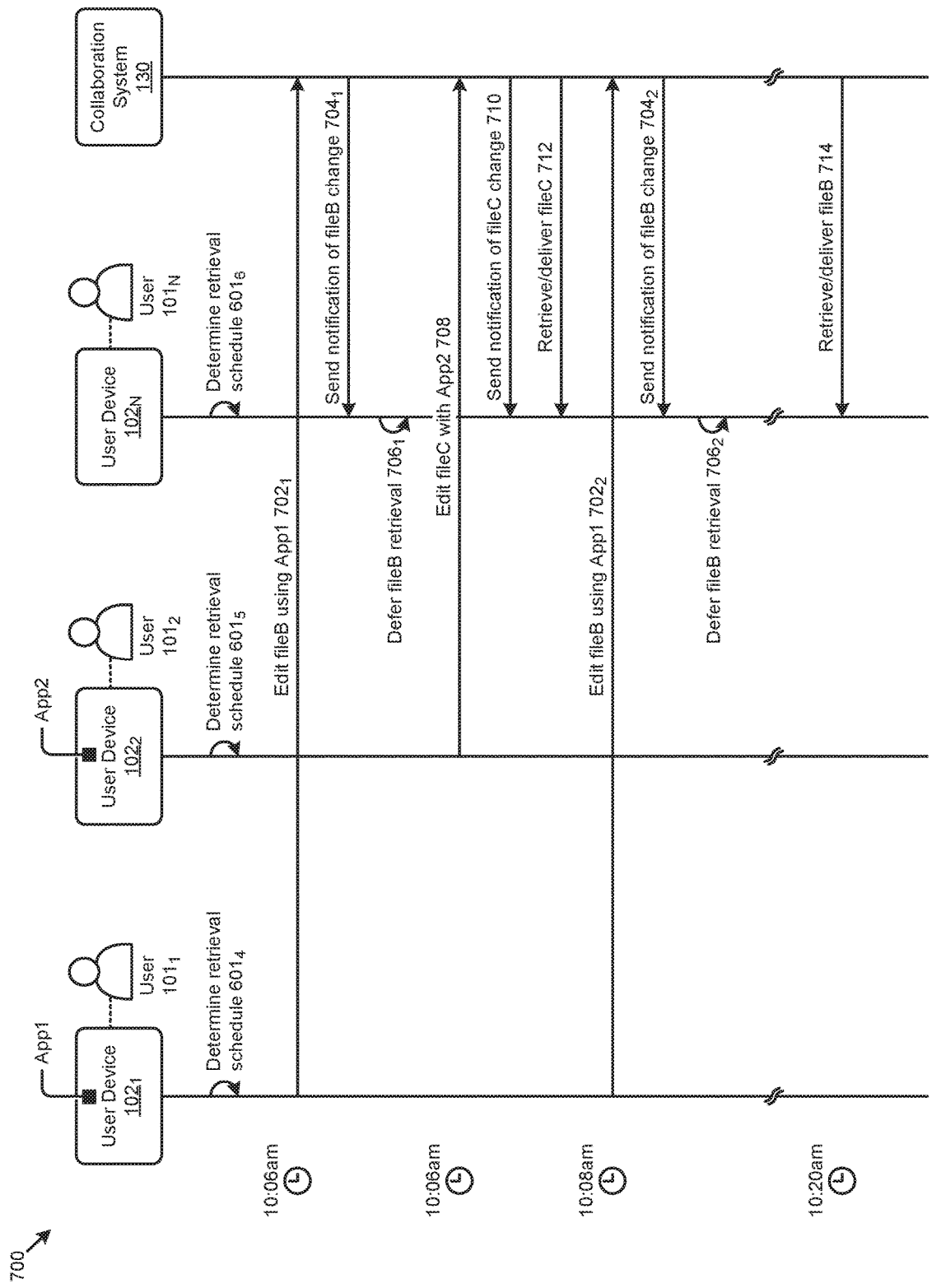
FIG. 7 illustrates a selective content object retrieval scenario for just-in-time retrieval of shared content objects, according to an embodiment.

FIG. 7 illustrates a selective content object retrieval scenario 700 for just-in-time retrieval of shared content objects. As an option, one or more variations of selective content object retrieval scenario 700 or any aspect thereof may be implemented in the context of the architecture and functionality of the embodiments described herein. The selective content object retrieval scenario 700 or any aspect thereof may be implemented in any environment.

FIG. 7 illustrates aspects pertaining to considering usage patterns and environmental conditions when scheduling downloading of selected content objects from a shared repository to a local computing environment of a particular user device. Specifically, the figure is being presented to illustrate a representative content object retrieval scenario in which the retrieval of certain content objects is scheduled based at least in part on a retrieval schedule determined according to the herein disclosed techniques. The high order interactions (e.g., operations, messages, etc.) of the scenario are performed by various computing components earlier described. The particular computing components shown in FIG. 7 are collaboration system 130 and representative instances of user devices (e.g., user device $102_1$, user device $102_2$, and user device $102_N$) and their users (e.g., user $101_1$, user $101_2$, and user $101_N$). As shown, applications App1 and App2 operate at user device $102_1$ and user device $102_2$, respectively.

The selective content object retrieval scenario 700 commences with a retrieval schedule being determined for each of the representative user devices (operation $601_4$, operation $601_5$, operation $601_6$) in accordance with the herein disclosed techniques. At some moment in time (e.g., 10:06 am), user $101_1$ edits fileB using App1 at user device $102_1$ and saves the changes at collaboration system 130 (message $702_1$). In response to detecting the edit event, collaboration system 130 sends a notification of the fileB change to user device $102_N$ of user $101_N$ (message $704_1$). In consideration of the retrieval schedule associated with user device $102_N$, the retrieval of fileB by user device $102_N$ in response to the notification is deferred (operation $706_1$). As an example, the information derived from the notification and/or the retrieval schedule at user device $102_N$ might indicate that user $101_1$ used App1 (e.g., a specialized app for efficiently editing files such as fileB) to perform the edit of fileB and, as such, is expected to perform additional edits within a short time period (e.g., a few minutes).

At the same or nearly the same moment in time as the foregoing activity (e.g., 10:06 am), user $101_2$ edits fileC using App2 on user device $102_2$ and saves the changes at collaboration system 130 (message 708). In response to detecting the edit event, collaboration system 130 sends a notification of the fileC change to user device $102_N$ of user $101_N$ (message 710). In consideration of the retrieval schedule associated with user device $102_N$, an instance of the changed fileC is retrieved from collaboration system 130 and delivered to user device $102_N$ (message 712). In this case, the information derived from the notification and/or the retrieval schedule at user device $102_N$ might indicate that user $101_2$ used App2 (e.g., a general-purpose web-based editing app) to perform the edit of fileC and, as such, is not expected to perform additional edits for a long period of time (e.g., one or more hours).

As further illustrated in selective content object retrieval scenario 700, when user $101_1$ edits fileB again (e.g., at 10:08 am) using App1 at user device $102_1$ (message $702_2$), collaboration system 130 sends a notification of the fileB change to user device $102_N$ of user $101_N$ (message $704_2$). The retrieval of the changed fileB by user device $102_N$ is again deferred in accordance with the retrieval schedule associated with user device $102_N$ (operation $706_2$).

At some later moment in time (e.g., 10:20 am), the retrieval schedule associated with user device $102_N$ triggers the retrieval of the most up-to-date instance of fileB from collaboration system 130 (message 714) and delivered to user device $102_N$. For example, the foregoing retrieval of fileB may be scheduled in the retrieval schedule based at least in part on a detected and/or predicted lower level of collaboration activity over fileB by its various collaborators (e.g., user $101_1$).

Additional Embodiments of the Disclosure

Additional Practical Application Examples

Figure 8A:
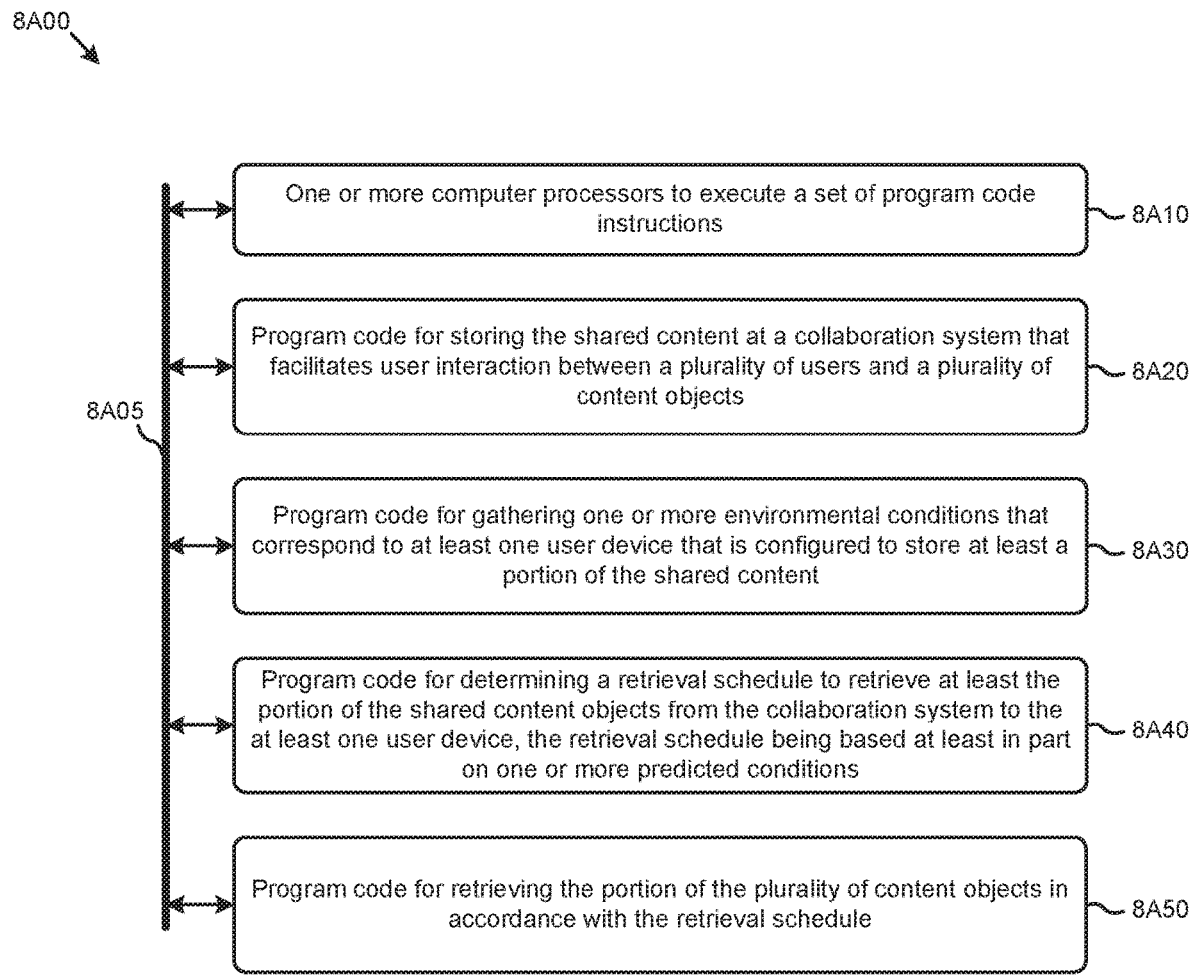
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually or as combined, serve to form improved technological processes that address knowing when to initiate retrieval of which shared content objects from a shared repository to the local computing environment of a particular user device. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment. The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with any other operations over communication path 8A05. The modules of the system can, individually or in combination, perform method operations within system 8A00. Any operations performed within system 8A00 may be performed in any order unless as may be specified in the claims. The shown embodiment implements a portion of a computer system, presented as system 8A00, comprising one or more computer processors to execute a set of program code instructions (module 8A10) and modules for accessing memory to hold program code instructions to perform: storing the shared content at a collaboration system that facilitates user interaction between a plurality of users and a plurality of content objects (module 8A20); gathering one or more environmental conditions that correspond to at least one user device that is configured to store at least a portion of the shared content (module 8A30); determining a retrieval schedule to retrieve at least the portion of the shared content objects from the collaboration system to the at least one user device, the retrieval schedule being based at least in part on one or more predicted conditions (module 8A40); and retrieving the portion of the plurality of content objects in accordance with the retrieval schedule (module 8A50).

Some embodiments further comprise steps for forming a time-series of predicted conditions based at least in part on the one or more environmental conditions; and mapping the portion of the plurality of content objects to the time-series of prediction conditions. Some embodiments operate such that the retrieval schedule is determined by applying a set of scheduling logic to at least one of, the time-series of predicted conditions, or one or more content object attributes associated with the plurality of content objects.

Some embodiments further comprise generating one or more retrieval instructions to retrieve the portion of the plurality of content objects in accordance with the retrieval schedule, and some embodiments operate such that the portion of the plurality of content objects is derived from a content object heatmap.

Some embodiments operate such that the portion of the plurality of content objects is selected based at least in part on interaction events between the plurality of users and the plurality of content objects.

Some embodiments operate such that at least a portion of the user interaction between the plurality of users and the plurality of content objects comprises one or more of, a user-content interaction, or a user-to-user interaction.

Some embodiments operate such that the portion of the plurality of content objects is selected based at least in part on a plurality of interaction scores that are assigned to respective ones of the plurality of content objects.

Some embodiments operate such that the one or more environmental conditions pertains to at least one of, a time, a network type, a network strength, a location, a status, a calendar entry, or a notification.

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

Figure 8B:
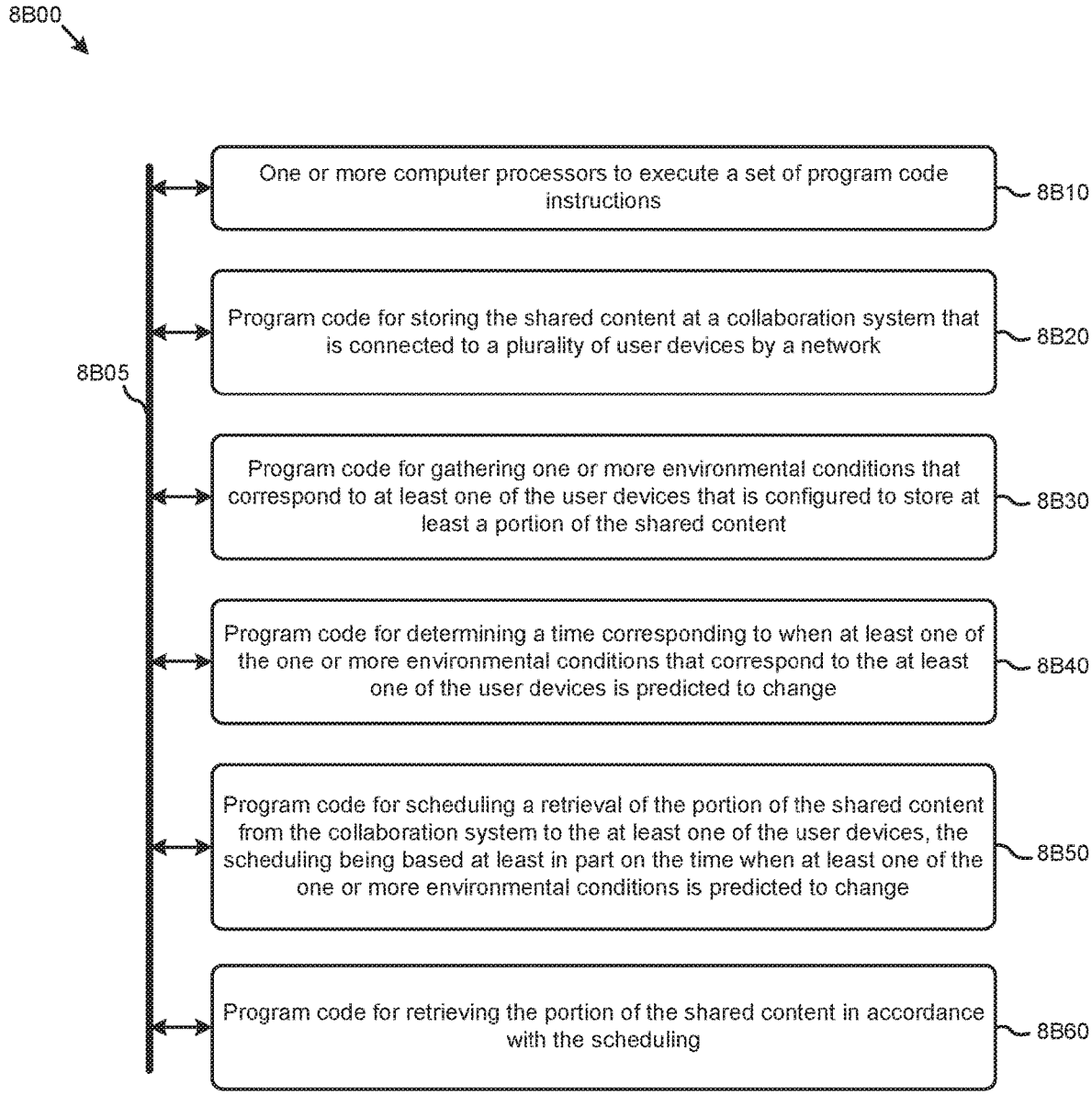

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with any other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising one or more computer processors to execute a set of program code instructions (module 8B10) and modules for accessing memory to hold program code instructions to perform: storing the shared content at a collaboration system that is connected to a plurality of user devices by a network (module 8B20); gathering one or more environmental conditions that correspond to at least one of the user devices that is configured to store at least a portion of the shared content (module 8B30); determining a time corresponding to when at least one of the one or more environmental conditions that correspond to the at least one of the user devices is predicted to change (module 8B40); scheduling a retrieval of the portion of the shared content from the collaboration system to the at least one of the user devices, the scheduling being based at least in part on the time when at least one of the one or more environmental conditions is predicted to change (module 8B50); and retrieving the portion of the shared content in accordance with the scheduling (module 8B60).

System Architecture Overview

Additional System Architecture Examples

Figure 9A:
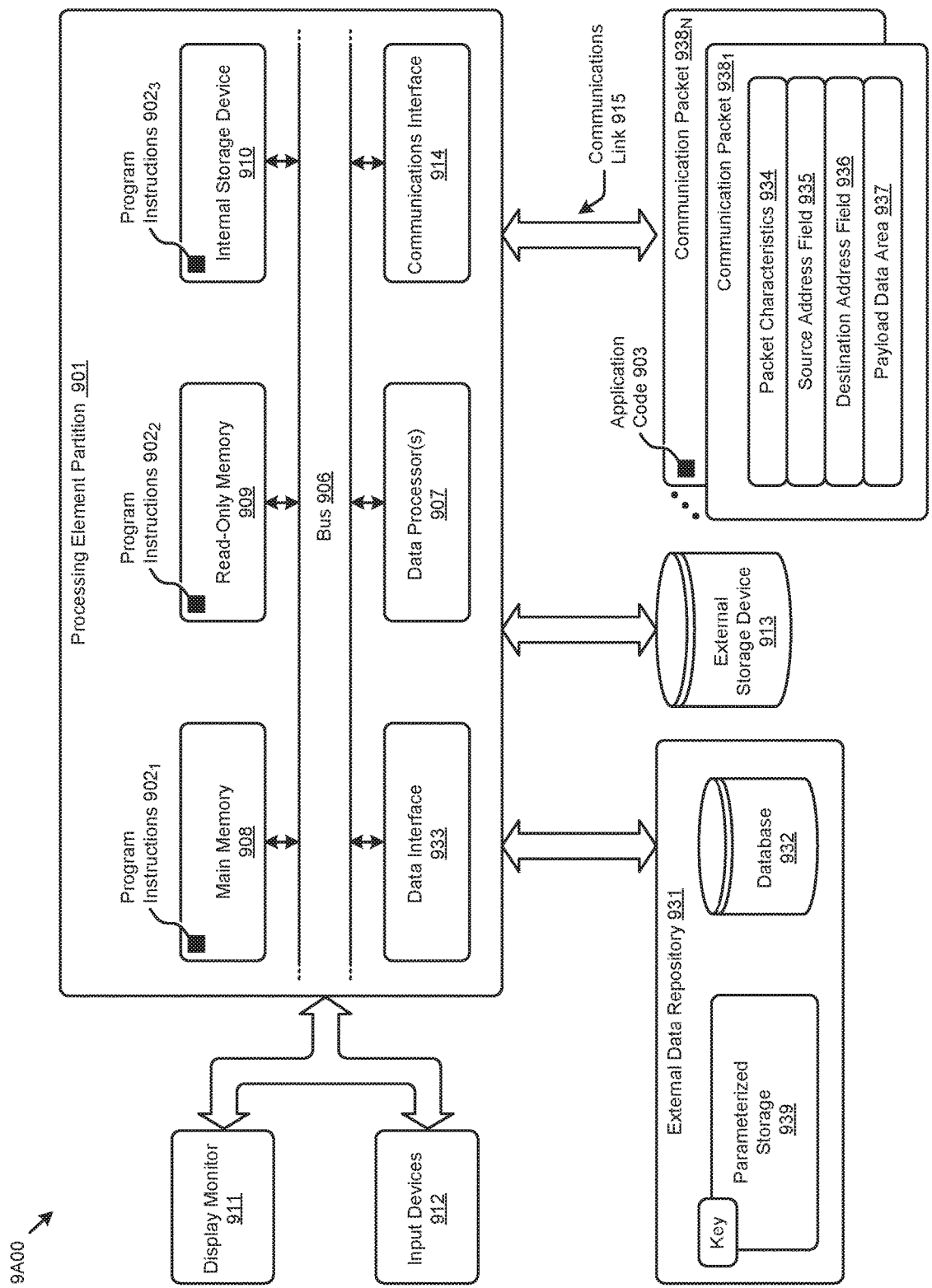
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to just-in-time retrieval of shared content objects. A module may include one or more state machines and/or combinational logic used to implement or facilitate the operational and/or performance characteristics pertaining to just-in-time retrieval of shared content objects.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of just-in-time retrieval of shared content objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to just-in-time retrieval of shared content objects, and/or for improving the way data is manipulated when performing computerized operations that consider usage patterns and environmental conditions when scheduling downloading of selected content objects from a shared repository to a local computing environment of a particular user device.

Figure 9B:
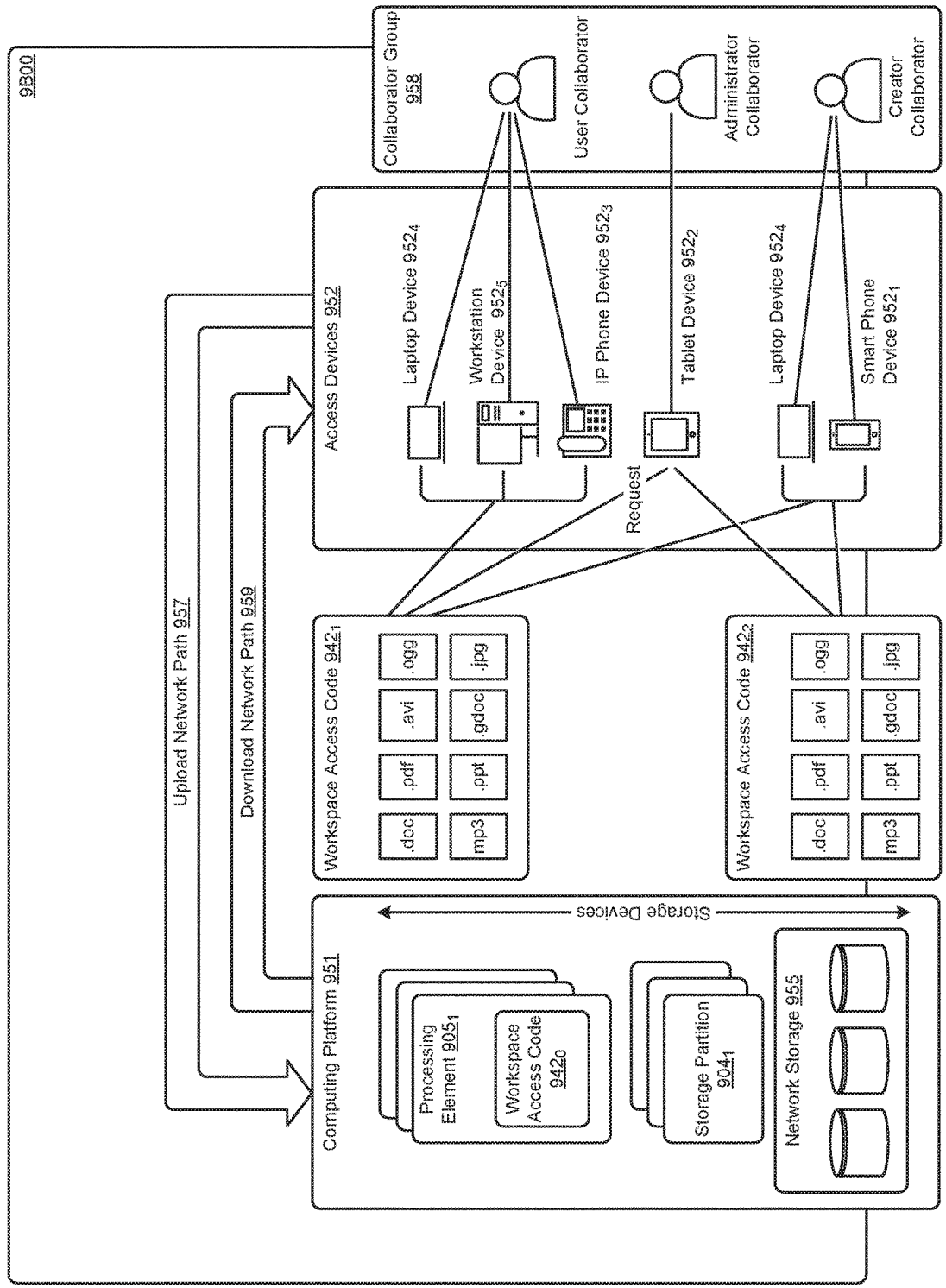

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of access devices 952 (e.g., laptop device $952_4$, workstation device $952_5$, IP phone device $952_3$, tablet device $952_2$, smart phone device $952_1$, etc.), and can be configured to access any type of object. Strictly as examples, such objects can be folders or directories or can be files of any filetype. A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for scheduling retrieval of shared content, the method comprising:
   storing the shared content at a collaboration system that is connected to a plurality of user devices by a network;
   gathering one or more environmental conditions that correspond to at least one of the user devices that is configured to store at least a portion of the shared content;
   predicting a time corresponding to when at least one of the one or more environmental conditions that correspond to the at least one of the user devices is predicted to change to an offline condition;
   scheduling a retrieval of the portion of the shared content from the collaboration system to the at least one of the user devices, the scheduling being based at least in part on the time when at least one of the one or more environmental conditions for the at least one of the user devices is predicted to change to the offline condition; and
   retrieving the portion of the shared content to the at least one of the user devices in accordance with the scheduling that is based upon the prediction of the offline condition.

2. The method of claim 1, wherein the time corresponding to when at least one of the one or more environmental conditions is predicted to change is a specific time associated with a usage pattern.

3. The method of claim 1, wherein the time is one of a set of specific times used in respective retrieval schedules that correspond to known or predicted collaboration activities.

4. The method of claim 1, wherein the time used in the scheduling is determined based on at least one of, a time-series of predicted conditions, or one or more content object attributes associated with the shared content.

5. The method of claim 1, wherein the predicting of the time is performed by:
   forming a time-series of predicted conditions; and
   mapping the portion of the shared content to the time-series of predicted conditions.

6. The method of claim 5, wherein in the scheduling is performed based at least in part by applying a set of scheduling logic to at least one of, the time-series of predicted conditions, or one or more content object attributes associated with the portion of the shared content.

7. The method of claim 1, further comprising:
   generating one or more retrieval instructions to retrieve the portion of the shared content in accordance with the retrieval schedule.

8. The method of claim 1, wherein the portion of the shared content is derived from a content object heatmap.

9. The method of claim 8, wherein the content object heatmap corresponds to at least one user, the at least one user being associated with the at least one user device.

10. The method of claim 1, wherein the portion of the shared content is selected based at least in part on interaction events.

11. The method of claim 10, wherein at least a portion of the interaction events comprises at least one of, a user-content interaction, or a user-to-user interaction.

12. The method of claim 1, wherein the one or more environmental conditions pertains to at least one of, a time, a network type, a network strength, a location, a velocity, a status, a calendar entry, or a notification.

13. The method of claim 12, wherein the notification derives from calendar entry details.

14. A non-transitory computer readable medium having stored thereon a sequence of instructions which, when stored in memory and executed by one or more processors causes the one or more processors to perform a set of acts for scheduling retrieval of shared content, the set of acts comprising:

storing the shared content at a collaboration system that is connected to a plurality of user devices by a network;

gathering one or more environmental conditions that correspond to at least one of the user devices that is configured to store at least a portion of the shared content;

predicting a time corresponding to when at least one of the one or more environmental conditions that correspond to the at least one of the user devices is predicted to change to an offline condition;

scheduling a retrieval of the portion of the shared content from the collaboration system to the at least one of the user devices, the scheduling being based at least in part on the time when at least one of the one or more environmental conditions for the at least one of the user devices is predicted to change to the offline condition; and retrieving the portion of the shared content to the at least one of the user devices in accordance with the scheduling that is based upon the prediction of the offline condition.

15. The non-transitory computer readable medium of claim 14, wherein the time corresponding to when at least one of the one or more environmental conditions is predicted to change is a specific time associated with a usage pattern.

16. The non-transitory computer readable medium of claim 14, wherein the time is one of a set of specific times used in respective retrieval schedules that correspond to known or predicted collaboration activities.

17. The non-transitory computer readable medium of claim 14, wherein the time used in the scheduling is determined based on at least one of, a time-series of predicted conditions, or one or more content object attributes associated with the shared content.

18. The non-transitory computer readable medium of claim 14, wherein the predicting of the time is performed by further instructions which, when stored in memory and executed by the one or more processors causes the one or more processors to perform acts of:

forming a time-series of predicted conditions; and mapping the portion of the shared content to the time-series of predicted conditions.

19. A system for scheduling retrieval of shared content, the system comprising:

a storage medium having stored thereon a sequence of instructions; and one or more processors that execute the instructions to cause the one or more processors to perform a set of acts, the set of acts comprising, storing the shared content at a collaboration system that is connected to a plurality of user devices by a network;

gathering one or more environmental conditions that correspond to at least one of the user devices that is configured to store at least a portion of the shared content;

predicting a time corresponding to when at least one of the one or more environmental conditions that correspond to the at least one of the user devices is predicted to change to an offline condition;

scheduling a retrieval of the portion of the shared content from the collaboration system to the at least one of the user devices, the scheduling being based at least in part on the time when at least one of the one or more environmental conditions for the at least one of the user devices is predicted to change to the offline condition; and retrieving the portion of the shared content to the at least one of the user devices in accordance with the scheduling that is based upon the prediction of the offline condition.

20. The system of claim 19, wherein the time corresponding to when at least one of the one or more environmental conditions is predicted to change is a specific time associated with a usage pattern.

* * * * *